United States Patent
Lunttila et al.

(10) Patent No.: US 11,044,721 B2
(45) Date of Patent: Jun. 22, 2021

(54) CONTROL DATA SIGNALING FRAMEWORK FOR LTE-LAA COMMUNICATION SYSTEMS EMPLOYING CARRIER AGGREGATION ON UNLICENSED BANDS

(71) Applicant: Nokia Solutions and Networks Oy, Espoo (FI)

(72) Inventors: Timo Erkki Lunttila, Espoo (FI); Klaus Hugl, Vienna (AT); Esa Tapani Tiirola, Kempele (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 54 days.

(21) Appl. No.: 15/513,207

(22) PCT Filed: Sep. 26, 2014

(86) PCT No.: PCT/EP2014/070667
§ 371 (c)(1),
(2) Date: Mar. 22, 2017

(87) PCT Pub. No.: WO2016/045744
PCT Pub. Date: Mar. 31, 2016

(65) Prior Publication Data
US 2017/0311320 A1    Oct. 26, 2017

(51) Int. Cl.
*H04W 72/04* (2009.01)
*H04L 5/14* (2006.01)
(Continued)

(52) U.S. Cl.
CPC ....... *H04W 72/0446* (2013.01); *H04L 1/1896* (2013.01); *H04L 5/001* (2013.01);
(Continued)

(58) Field of Classification Search
CPC ............. H04W 72/0446; H04W 16/14; H04W 52/0216; H04L 5/001; H04L 5/0073
See application file for complete search history.

(56) References Cited

U.S. PATENT DOCUMENTS

2011/0176461 A1* 7/2011 Astely ................. H04B 7/2656
370/280
2013/0315114 A1* 11/2013 Seo ......................... H04L 5/001
370/280

(Continued)

OTHER PUBLICATIONS

"Review of Regulatory Requirements for Unlicensed Spectrum", 3GPP TSG-RAN #63, RP-140054, Alcatel-Lucent, Mar. 3-6, 2014, pp. 1-16.

(Continued)

*Primary Examiner* — Jeffrey M Rutkowski
*Assistant Examiner* — Chae S Lee
(74) *Attorney, Agent, or Firm* — Brake Hughes Bellermann LLP

(57) ABSTRACT

There is provided a method comprising controlling receiving, at a node, subframe type configuration information, said subframe type configuration information defining at least one subframe type of a group of subframes to be used in a secondary cell, said secondary cell configured to provide at least one of licensed-assisted access, licensed shared access and co-primary sharing access and using said subframe type configuration information to cause the node to operate in accordance with that configuration in the secondary cell.

12 Claims, 8 Drawing Sheets

---

Controlling receiving, at a node, subframe type configuration information, said subframe type configuration information defining at least one subframe type of a group of subframes to be used in a secondary cell, said secondary cell configured to provide at least one of licensed-assisted access, licensed shared access and co-primary sharing access Using said subframe type configuration information to cause the node to operate in accordance with that configuration in the secondary cell

(51) Int. Cl.
  *H04W 52/02*    (2009.01)
  *H04L 5/00*     (2006.01)
  *H04W 48/00*    (2009.01)
  *H04L 1/18*     (2006.01)
  *H04W 16/14*    (2009.01)
  *H04W 74/00*    (2009.01)

(52) U.S. Cl.
  CPC .......... *H04L 5/0073* (2013.01); *H04L 5/1469* (2013.01); *H04W 16/14* (2013.01); *H04W 48/00* (2013.01); *H04W 52/0216* (2013.01); *H04W 74/006* (2013.01); *Y02D 30/70* (2020.08)

(56) References Cited

U.S. PATENT DOCUMENTS

| | | | | |
|---|---|---|---|---|
| 2014/0044105 A1* | 2/2014 | Bontu | ................ | H04L 5/001 370/336 |
| 2015/0223075 A1* | 8/2015 | Bashar | ................ | H04W 74/08 370/329 |
| 2015/0264699 A1* | 9/2015 | Fwu | ................ | H04L 5/0001 370/329 |
| 2016/0007347 A1* | 1/2016 | Nagata | ................ | H04W 16/30 370/280 |
| 2016/0066288 A1* | 3/2016 | Feng | ................ | H04W 52/54 370/280 |
| 2018/0219667 A1* | 8/2018 | Zhao | ................ | H04L 5/001 |
| 2019/0011852 A1* | 1/2019 | Frenne | ................ | H04B 7/0626 |

OTHER PUBLICATIONS

"Broadband Radio Access Networks (BRAN); 5 GHz high performance RLAN; Harmonized EN covering the essential requirements of article 3.2 of the R&TTE Directive", Draft ETSI EN 301 893, V1.7.2, Jul. 2014, pp. 1-95.

International Search Report and Written Opinion received for corresponding Patent Cooperation Treaty Application No. PCT/EP2014/070667 dated May 22, 2015, 9 pages.

Mihaela Beluri, et al.; "Mechanisms for LTE coexistence in the TV white space", IEEE International Symosium on Dynamic Spectrum Access Networks, Oct. 16, 2012, pp. 317-326, XP032342357.

* cited by examiner

Figure 5

> Providing subframe type configuration information to at least one node, said subframe type configuration information defining at least one subframe type of a group of subframes, the group of subframes to be used in a secondary cell, said secondary cell configured to provide at least one of licensed-assisted access, licensed shared access, and co-primary sharing access, wherein said subframe type configuration information is to be used to cause the at least one node to operate in accordance with that configuration in the secondary cell.

| LTE-UL Cell | STC | | | | | |
|---|---|---|---|---|---|---|
| | DL | DL | Special | Flexible | UL | UL |
| Number of HARQ-ACK bits | 2 | 2 | 2 | 2 | 0 | 0 |

Figure 7

CONTROL DATA SIGNALING FRAMEWORK FOR LTE-LAA COMMUNICATION SYSTEMS EMPLOYING CARRIER AGGREGATION ON UNLICENSED BANDS

RELATED APPLICATION

This application was originally filed as Patent Cooperation Treaty Application No. PCT/EP2014/070667 filed Sep. 26, 2014.

The present application relates to a method, apparatus and system and in particular but not exclusively, to control signalling arrangements for cellular network operation on unlicensed spectrum, aka licensed-assisted access (LAA).

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator.

In a first aspect there is provided a method comprising controlling receiving, at a node, subframe type configuration information, said subframe type configuration information defining at least one subframe type of a group of subframes to be used in a secondary cell, said secondary cell configured to provide at least one of licensed-assisted access, licensed shared access and co-primary sharing access and using said subframe type configuration information to cause the node to operate in accordance with that configuration in the secondary cell.

The at least one subframe type may comprise one of an uplink subframe, a downlink subframe, a special subframe, a downlink subframe carrying short-control signalling, an empty subframe and a flexible subframe.

The node may be a user equipment.

The node may be a first base station.

The method may comprise using said subframe type configuration information to determine when to perform at least one of a listen before talk procedure, channel state information measurements and feedback and control channel blind decoding.

The method may comprise using said subframe type configuration information to determine the number of acknowledgment bits for the at least one subframe in dependence on subframe type.

The method may comprise, wherein the node is a user equipment, indicating acknowledgement feedback or discontinuous reception for downlink subframes, special subframes including downlink pilot time slot and flexible subframes.

The method may comprise, wherein the node is a base station, reserving acknowledgement bits for downlink subframes, special subframes including downlink pilot time slot and flexible subframes.

The method may comprise using the subframe type configuration information to align transmission direction between the first base station and a second base station.

The method may comprise using the STC information to align timing of listen before talk procedure of at least the first base station and a second base station.

The method may comprise controlling receiving subframe type configuration information at the user equipment using the secondary cell.

The method may comprise controlling receiving subframe type configuration information at the user equipment using a primary cell.

The method may comprise controlling receiving subframe type configuration information at the user equipment via one of broadcast signaling, dedicated radio resource signaling, medium access control signaling and L1 signaling.

Said group of subframes may comprise a radio frame.

The subframe type configuration information may comprise clear channel assessment information.

In a second aspect there is provided a method comprising providing subframe type configuration information to at least one node, said subframe type configuration information defining at least one subframe type of a group of subframes, the group of subframes to be used in a secondary cell, said secondary cell configured to provide at least one of licensed-assisted access, licensed shared access and co-primary sharing access, wherein said subframe type configuration information is to be used to cause the at least one node to operate in accordance with that configuration in the secondary cell.

The node may be a user equipment.

The method may comprise causing subframe type configuration information to be sent to the user equipment using the secondary cell.

The method may comprise causing subframe type configuration information to be sent to the user equipment using a primary cell.

The method may comprise causing subframe type configuration information to be sent via one of broadcast signaling, dedicated radio resource signaling, medium access control signaling and L1 signaling.

The node may be a base station.

The method may comprise causing subframe type configuration to be sent to the base station via an X2 interface.

Said group of subframes may comprise a radio frame.

The at least one subframe type may comprise one of an uplink subframe, a downlink subframe, a special subframe, a downlink subframe carrying short-control signalling, an empty subframe and a flexible subframe.

The subframe type configuration information may comprises clear channel assessment information.

The subframe type configuration information may be used to determine when to perform at least one of a listen before talk procedure, channel state information measurements and feedback and control channel blind decoding.

The subframe type configuration information may be used to determine the number of acknowledgment bits for the at least one subframe in dependence on subframe type.

The subframe type configuration information may be used, wherein the node is a user equipment, to indicate acknowledgement feedback or discontinuous reception for downlink subframes, special subframes including downlink pilot time slot and flexible subframes.

The subframe type configuration information may be used, wherein the node is a base station, to reserve acknowledgement bits for downlink subframes, special subframes including downlink pilot time slot and flexible subframes.

The subframe type configuration information may be used to align transmission direction between the first base station and a second base station.

The subframe type configuration information may be used to align timing of listen before talk procedure of at least the first base station and a second base station.

In a third aspect, there is provided an apparatus comprising at least one processor and at least one memory including a computer program code, the at least one memory and the computer program code configured to, with the at least one processor, cause the apparatus at least to control receiving, at a node, subframe type configuration information, said subframe type configuration information defining at least one subframe type of a group of subframes to be used in a secondary cell, said secondary cell configured to provide at least one of licensed-assisted access, licensed shared access and co-primary sharing access and use said subframe type configuration information to cause the node to operate in accordance with that configuration in the secondary cell.

The at least one subframe type may comprise one of an uplink subframe, a downlink subframe, a special subframe, a downlink subframe carrying short-control signalling, an empty subframe and a flexible subframe.

The node may be a user equipment.

The node may be a first base station.

The apparatus may be configured to use said subframe type configuration information to determine when to perform at least one of a listen before talk procedure, channel state information measurements and feedback and control channel blind decoding.

The apparatus may be configured to use said subframe type configuration information to determine the number of acknowledgment bits for the at least one subframe in dependence on subframe type.

The apparatus may be configured to, wherein the node is a user equipment, indicating acknowledgement feedback or discontinuous reception for downlink subframes, special subframes including downlink pilot time slot and flexible subframes.

The apparatus may be configured to, wherein the node is a base station, reserving acknowledgement bits for downlink subframes, special subframes including downlink pilot time slot and flexible subframes.

The apparatus may be configured to use the subframe type configuration information to align transmission direction between the first base station and a second base station.

The apparatus may be configured to use the STC information to align timing of listen before talk procedure of at least the first base station and a second base station.

The apparatus may be configured to control receiving subframe type configuration information at the user equipment using the secondary cell.

The apparatus may be configured to control receiving subframe type configuration information at the user equipment using a primary cell.

The apparatus may be configured to control receiving subframe type configuration information at the user equipment via one of broadcast signaling, dedicated radio resource signaling, medium access control signaling and L1 signaling.

Said group of subframes may comprise a radio frame.

The subframe type configuration information may comprise clear channel assessment information.

In a fourth aspect there is provided an apparatus comprising at least one processor and at least one memory including a computer program code, the at least one memory and the computer program code configured to, with the at least one processor, cause the apparatus at least to provide subframe type configuration information to at least one node, said subframe type configuration information defining at least one subframe type of a group of subframes, the group of subframes to be used in a secondary cell, said secondary cell configured to provide at least one of licensed-assisted access, licensed shared access and co-primary sharing access, wherein said subframe type configuration information is to be used to cause the at least one node to operate in accordance with that configuration in the secondary cell.

The node may be a user equipment.

The apparatus may be configured to cause subframe type configuration information to be sent to the user equipment using the secondary cell.

The apparatus may be configured to cause subframe type configuration information to be sent to the user equipment using a primary cell.

The apparatus may be configured to cause subframe type configuration information to be sent via one of broadcast signaling, dedicated radio resource signaling, medium access control signaling and L1 signaling.

The node may be a base station.

The apparatus may be configured to cause subframe type configuration to be sent to the base station via an X2 interface.

Said group of subframes may comprise a radio frame.

The at least one subframe type may comprise one of an uplink subframe, a downlink subframe, a special subframe, a downlink subframe carrying short-control signalling, an empty subframe and a flexible subframe.

The subframe type configuration information may comprises clear channel assessment information.

The subframe type configuration information may be used to determine when to perform at least one of a listen before talk procedure, channel state information measurements and feedback and control channel blind decoding.

The subframe type configuration information may be used to determine the number of acknowledgment bits for the at least one subframe in dependence on subframe type.

The subframe type configuration information may be used, wherein the node is a user equipment, to indicate acknowledgement feedback or discontinuous reception for downlink subframes, special subframes including downlink pilot time slot and flexible subframes.

The subframe type configuration information may be used, wherein the node is a base station, to reserve acknowledgement bits for downlink subframes, special subframes including downlink pilot time slot and flexible subframes.

The subframe type configuration information may be used to align transmission direction between the first base station and a second base station.

The subframe type configuration information may be used to align timing of listen before talk procedure of at least the first base station and a second base station.

In a fifth aspect there is provided a computer program embodied on a non-transitory computer-readable storage medium, the computer program comprising program code for controlling a process to execute a process, the process comprising controlling receiving, at a node, subframe type configuration information, said subframe type configuration information defining at least one subframe type of a group of subframes to be used in a secondary cell, said secondary cell configured to provide at least one of licensed-assisted access, licensed shared access and co-primary sharing access and using said subframe type configuration information to cause the node to operate in accordance with that configuration in the secondary cell.

The at least one subframe type may comprise one of an uplink subframe, a downlink subframe, a special subframe, a downlink subframe carrying short-control signalling, an empty subframe and a flexible subframe.

The node may be a user equipment.

The node may be a first base station.

The process may comprise using said subframe type configuration information to determine when to perform at least one of a listen before talk procedure, channel state information measurements and feedback and control channel blind decoding.

The process may comprise using said subframe type configuration information to determine the number of acknowledgment bits for the at least one subframe in dependence on subframe type.

The process may comprise, wherein the node is a user equipment, indicating acknowledgement feedback or discontinuous reception for downlink subframes, special subframes including downlink pilot time slot and flexible subframes.

The process may comprise, wherein the node is a base station, reserving acknowledgement bits for downlink subframes, special subframes including downlink pilot time slot and flexible subframes.

The process may comprise using the subframe type configuration information to align transmission direction between the first base station and a second base station.

The process may comprise using the STC information to align timing of listen before talk procedure of at least the first base station and a second base station.

The process may comprise controlling receiving subframe type configuration information at the user equipment using the secondary cell.

The process may comprise controlling receiving subframe type configuration information at the user equipment using a primary cell.

The process may comprise controlling receiving subframe type configuration information at the user equipment via one of broadcast signaling, dedicated radio resource signaling, medium access control signaling and L1 signaling.

Said group of subframes may comprise a radio frame.

The subframe type configuration information may comprise clear channel assessment information.

In a sixth aspect there is provided a computer program embodied on a non-transitory computer-readable storage medium, the computer program comprising program code for controlling a process to execute a process, the process comprising providing subframe type configuration information to at least one node, said subframe type configuration information defining at least one subframe type of a group of subframes, the group of subframes to be used in a secondary cell, said secondary cell configured to provide at least one of licensed-assisted access, licensed shared access and co-primary sharing access, wherein said subframe type configuration information is to be used to cause the at least one node to operate in accordance with that configuration in the secondary cell.

The node may be a user equipment.

The process may comprise causing subframe type configuration information to be sent to the user equipment using the secondary cell.

The process may comprise causing subframe type configuration information to be sent to the user equipment using a primary cell.

The process may comprise causing subframe type configuration information to be sent via one of broadcast signaling, dedicated radio resource signaling, medium access control signaling and L1 signaling.

The node may be a base station.

The process may comprise causing subframe type configuration to be sent to the base station via an X2 interface.

Said group of subframes may comprise a radio frame.

The at least one subframe type may comprise one of an uplink subframe, a downlink subframe, a special subframe, a downlink subframe carrying short-control signalling, an empty subframe and a flexible subframe.

The subframe type configuration information may comprises clear channel assessment information.

The subframe type configuration information may be used to determine when to perform at least one of a listen before talk procedure, channel state information measurements and feedback and control channel blind decoding.

The subframe type configuration information may be used to determine the number of acknowledgment bits for the at least one subframe in dependence on subframe type.

The subframe type configuration information may be used, wherein the node is a user equipment, to indicate acknowledgement feedback or discontinuous reception for downlink subframes, special subframes including downlink pilot time slot and flexible subframes.

The subframe type configuration information may be used, wherein the node is a base station, to reserve acknowledgement bits for downlink subframes, special subframes including downlink pilot time slot and flexible subframes.

The subframe type configuration information may be used to align transmission direction between the first base station and a second base station.

The subframe type configuration information may be used to align timing of listen before talk procedure of at least the first base station and a second base station.

In a seventh aspect there is provided an apparatus, said apparatus comprising means for performing the method of the first and/or second aspects.

In an eighth aspect there is provided a computer program product for a computer, comprising software code portions for performing the steps the method of the first and/or second aspects when said product is run on the computer.

In the above, many different embodiments have been described. It should be appreciated that further embodiments may be provided by the combination of any two or more of the embodiments described above.

Embodiments will now be described, by way of example only, with reference to the accompanying Figures in which:

FIG. 5 shows a flow chart of an example method of control signalling for LAA;

FIG. 7 shows an example HARQ-ACK codebook and connection to a subframe type configuration;

Before explaining in detail the examples, certain general principles of a wireless communication system and mobile communication devices are briefly explained with reference to FIGS. 1 to 2 to assist in understanding the technology underlying the described examples.

Figure 1:
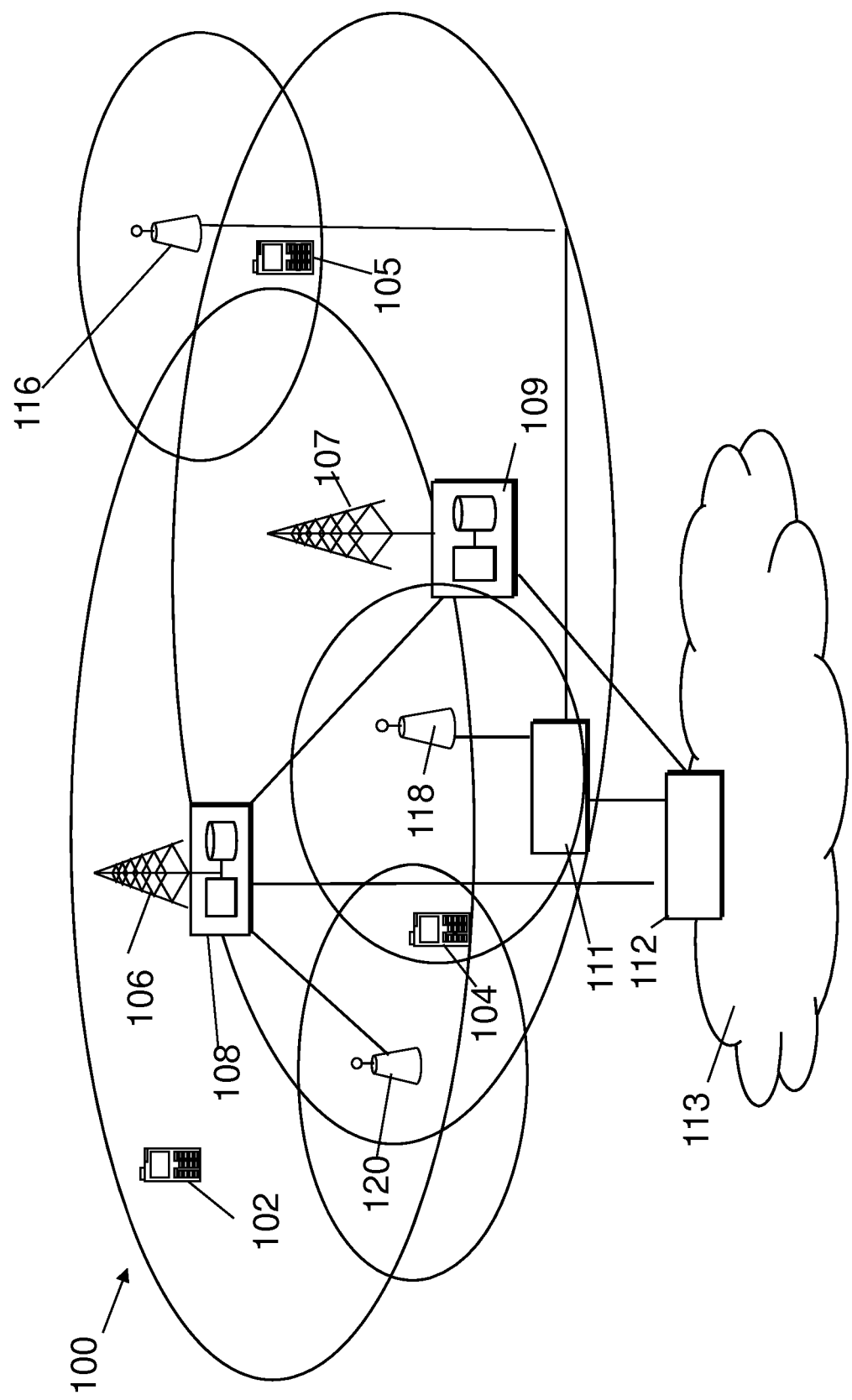
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 8.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
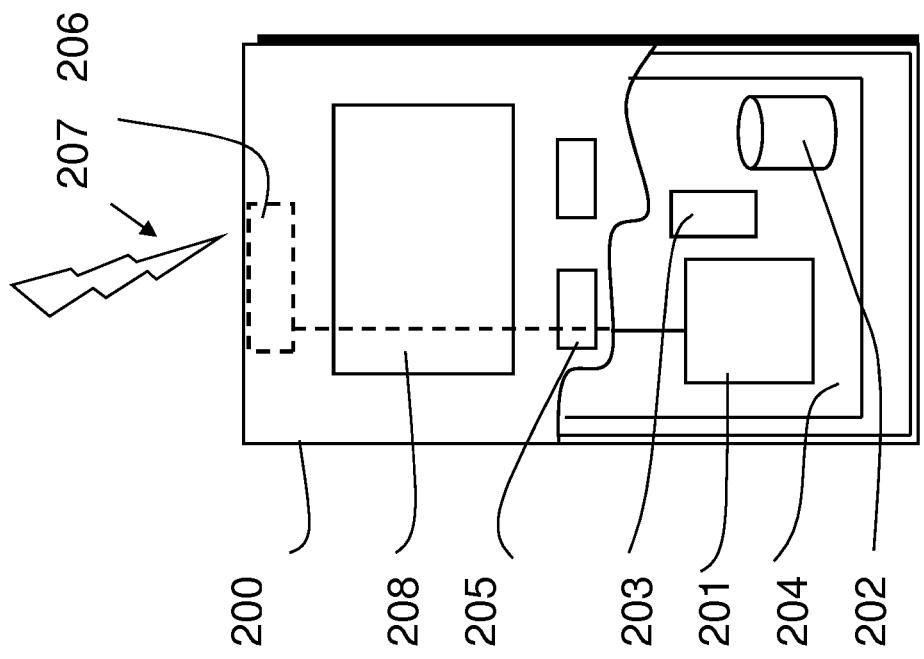
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Wireless communication systems are licensed to operate in particular spectrum bands. A technology, for example LTE, may operate, in addition to licensed band, also in an unlicensed band which may opportunistically improve data throughput. An example is LTE License-Assisted Access (LAA), that is able to aggregate secondary cells (SCells) in the 5 GHz band combined with FDD or TDD primary cell (PCell) in licensed bands through LTE Advanced carrier aggregation principles. This disclosure relates to interference management for unlicensed spectrum usage at least within a single operator network deployment, for example LTE LAA.

Different regions have different regulatory requirements for unlicensed band operation. These are summarized in 3GPP TDoc RP-140054 ("Review of Regulatory Requirements for Unlicensed Spectrum"). Despite the regulatory rules, LTE has not yet been deployed in unlicensed spectrum.

In Europe, the regulations mandate the equipment operating on unlicensed spectrum to implement Listen-before-talk (LBT) by performing Clear Channel Assessment (CCA) before starting a transmission, to verify that the operating channel is not occupied. ETSI document EN 301 893 defines European regulatory requirements for unlicensed 5 GHz band. This document defines two of modes of operation: Frame Based Equipment (FBE), and Load Based Equipment (LBE). Before starting transmissions on an operating channel, the equipment shall perform a CCA check. The equipment shall observe the operating channel(s) for the duration of the CCA observation time which, as currently defined, shall be not less than 20 µs. The operating channel shall be considered occupied if the energy level in the channel exceeds the predefined threshold. The threshold may be proportional to the maximum transmit power of the observing node.

FBE is equipment where the transmit/receive structure is not directly demand-driven but has fixed timing. The corresponding European regulatory rules are defined in ETSI document EN 301 893.

Figure 3:
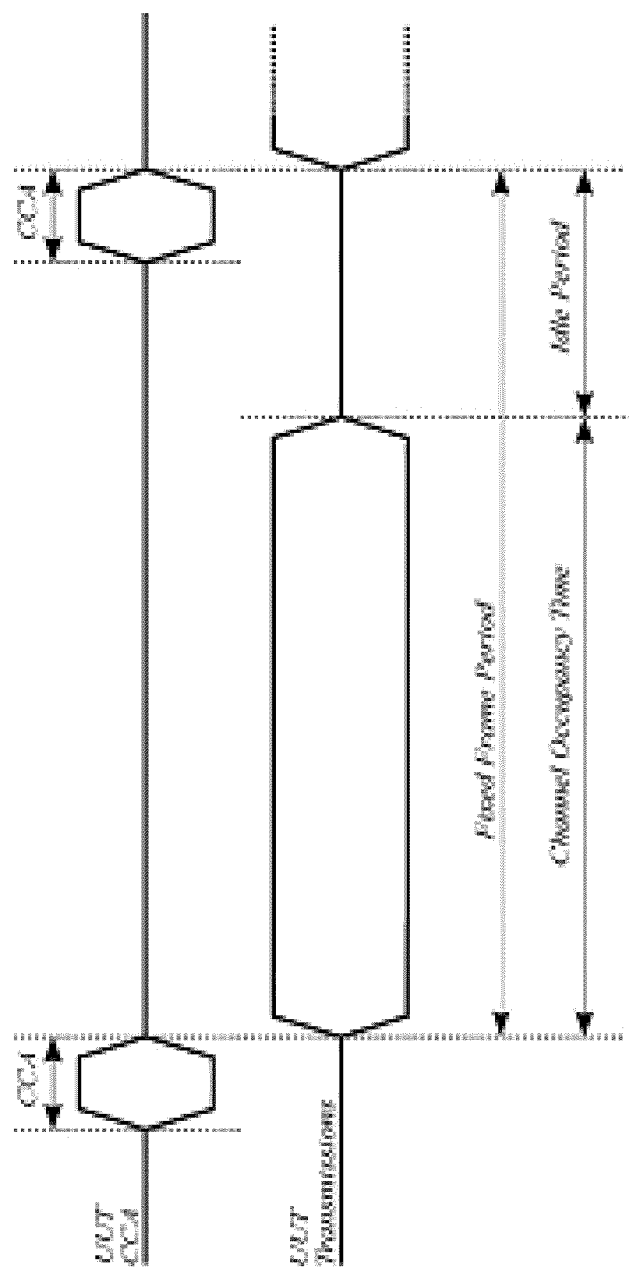
FIG. 3 shows a timing diagram of a listen before talk procedure.

FIG. 3 shows a timing diagram of a LBT procedure for FBE. For FBE, CCA may be performed periodically at predefined time instances according to a predetermined frame structure where the periodicity (Fixed Frame Period) =channel occupancy time+idle period).

If the equipment finds the operating channel(s) to be clear before the start of the fixed frame period, it may transmit immediately. The total time during which an equipment has transmissions on a given channel without re-evaluating the availability of that channel, is defined as the channel occupancy time. If the equipment finds an operating channel occupied before the start of the fixed frame period, it shall not transmit on that channel during the next Fixed Frame Period.

LBE is equipment where the transmit/receive structure is not fixed in time but demand-driven. Unlike for FBE, LBE is not restricted to implement LBT, for example by performing CCA, according to a frame structure having fixed frame timing. Instead, LBE may perform CCA whenever it has data to transmit. In LBE, before a transmission or a burst of transmissions on an Operating Channel, the equipment may perform a CCA check by detecting energy in the operating channel. If the equipment finds the Operating Channel(s) to be clear, it may transmit immediately. The total time that an equipment makes use of an Operating Channel is the Maximum Channel Occupancy Time which shall be less than $(13/32) \times q$ ms, where $q=\{4 \ldots 32\}$. I.e. when $q=32$, the Maximum Channel Occupancy Time=13 ms.

If the equipment finds an Operating Channel occupied, it shall not transmit in that channel. The equipment may then perform an Extended CCA check in which the Operating Channel(s) is/are observed for the duration of a random factor N multiplied by the CCA observation time. N defines the number of clear idle slots resulting in a total Idle Period that need to be observed before initiation of the transmission. The value of N may be randomly selected in the range $1 \ldots q$ every time an Extended CCA is required and the value may be stored in a counter. The counter may be decremented every time a CCA slot is considered to be "unoccupied". When the counter reaches zero, the equipment may transmit.

Considering in general a network of communication nodes, there is interference present when several nodes are transmitting at the same time. The usage rules for unlicensed spectrum includes mechanisms to handle interference in terms of listening before talk (LBT), as discussed above. A node may only be allowed to transmit when it senses the channel to be unoccupied (i.e. when a received signal strength is below a certain threshold). This is the main mechanism to manage interference for unlicensed band usage. Technologies only specifying PHY/MAC (such as WLAN) may therefore be limited to co-existence and interference management schemes. WLAN performance and/or fairness compared to a coordinated system (such as LTE) may start to decrease as the number of UEs and access points (APs) in a network increases.

Dense LTE-TDD (time division duplex) deployments assume accurate network synchronization and coordination of e.g. uplink (UL)-downlink (DL) configurations in nearby cells. Otherwise, interference, especially cross-link interference (i.e. UL-to-DL or DL-to-UL), may cause degradation to system performance. As discussed above, unlicensed band communication technologies such as IEEE 802.11 a/b/g/n/ac only define PHY/MAC and therefore no interference coordination mechanisms are applicable. Operation on unlicensed spectrum may cause complications to, for example, cellular deployments of LTE LAA (unlicensed band LTE SCells).

In the case of licensed band LTE TDD operation, a UE is informed about the UL/DL configuration applied through system information block (SIB) signalling. A feature known as Enhanced Interference Mitigation & Traffic Adaptation (eIMTA) was introduced for licensed band LTE TDD operation, enabling, in addition to a fixed (semi-static) UL/DL split, a possibility to dynamically select the UL/DL ratio among the existing seven UL-DL configurations. The dynamically selected UL-DL configuration may also be specific for a cell or a group of cells. However, LTE TDD (including eIMTA) does not support LBT.

In this disclosure, License Assisted Access (LAA) operation of a network having higher layer support, such as LTE, is considered. In particular, interference management procedures to try to optimize the communication performance within the network are considered. In this operation, listen before talk (LBT) procedure based on European regulatory rules defined for 5 GHz ISM band is supported. It should be noted, that the discussions are not limited to the European regulation but equally apply also to other channel access mechanisms based on listen before talk.

Figure 4:
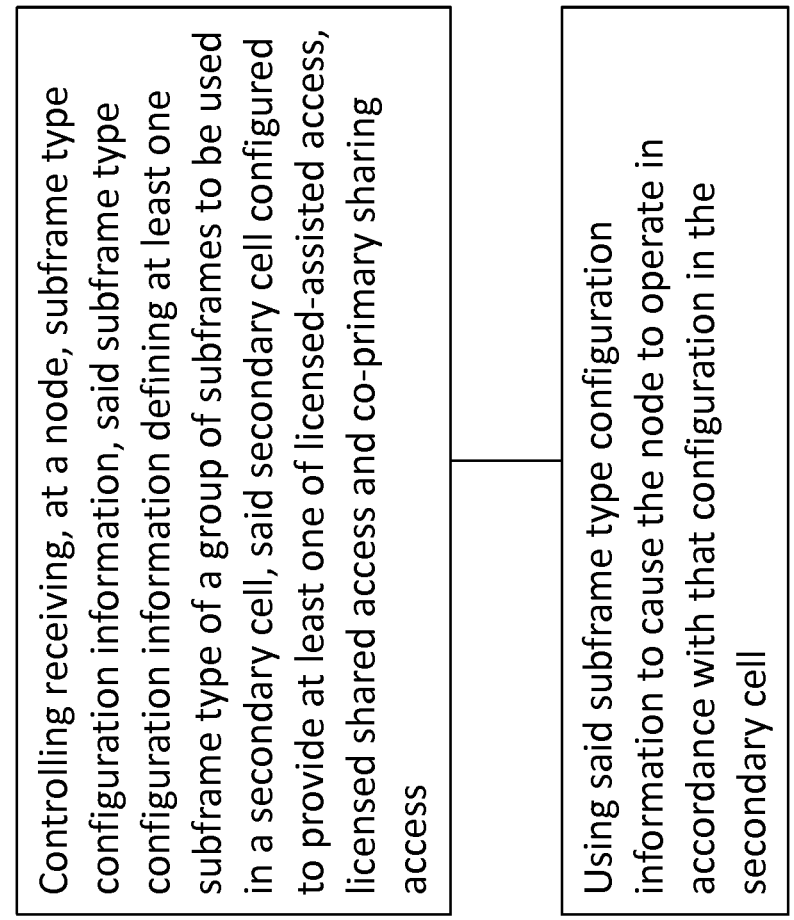
FIG. 4 shows a flow chart of an example method of control signalling for LAA.

FIGS. 4 and 5 show flowcharts of a method for managing interference, e.g. for LTE operation on unlicensed bands, taking both TDD and DL/UL operation into account. The method comprises controlling receiving, at a node, subframe type configuration (STC) information, said STC information defining at least one subframe type of a group of subframes to be used in a secondary cell (SCell), said secondary cell configured to provide at least one of licensed-assisted access, licensed shared access and co-primary sharing access. In a second step, the method comprises using said STC information to cause the node to operate in accordance with that configuration in the secondary cell.

The method shown in the flowchart of FIG. 5 comprises providing STC information to at least one node, said STC information defining at least one subframe type of a group of subframes, the group of subframes to be used in a secondary cell, said secondary cell configured to provide at least one of licensed-assisted access, licensed shared access and co-primary sharing access, wherein said STC information is to be used to cause the at least one node to operate in accordance with that configuration in the secondary cell.

Causing the at least one node to operate in accordance with the STC information may include at least one of controlling timing when said one node performs at least one of a listen before talk procedure and channel state information measurements and feedback, and providing information to said node on timing of at least one of transmission direction and listen before talk procedure. Causing the at least one node to operate in accordance with the STC information may include at least one of using said STC information to determine when to perform at least one of a listen before talk procedure, channel state information measurements and feedback and control channel blind decoding, using said STC information to determine the number of acknowledgment bits for the at least one subframe in dependence on subframe type, using the STC information to align transmission direction between the first base station and a second base station and using the STC information to align timing of listen before talk procedure of at least the first base station and a second base station.

The node may be a UE or a base station, such as eNB for LTE operation. The SCell may be a LAA SCell, i.e., the STC information relates to an SCell that is configured to provide licensed-assisted access.

The method defines a signaling framework to facilitate interference coordination across different base stations, such as LTE eNodeBs, and UEs operating on unlicensed bands subject to LBT requirements, i.e. operating LAA. TDD operation may be enabled, which is here considered generically to include DL-only, UL-only, and UL&DL operation on an unlicensed carrier. The method is applicable not just for both Frame Based Equipment and Load based equipment according to European regulation definitions but also for other, generic LBT-type of channel access mechanisms.

STC information, or signaling, may relate to all subframes of a radio frame. Alternatively, it may be defined for a group of subframes only (e.g. only for DL subframes).

The length, $L_{STC}$, of STC signalling, (in terms of subframes) may be configurable. $L_{STC}$ may be equal to, or divisible by, the periodicity of regular LAA transmissions. This may enable some synchronization, e.g. through short-control signaling (SCS) or other means. Values for $L_{STC}$ may include multiples of the LTE frame timing, e.g. 10, 20, 40, 80 ms.

A base station, such as an eNB may define the STC information. It may use different aspects into account when defining STC. The aspects to be taken into account may include, amongst others, traffic profile, regulatory rules/parameters, equipment type (e.g. LBE or FBE), CCA length, parameter q (LBE only), fixed frame period (FBE only), traffic situation (i.e. UL/DL ratio) in the given cell/cell cluster and STC signalling from neighboring cells (possibly from different operators).

A base station can vary the STC signalling within a parameter defined by $L_{STC}$. Variation of $L_{STC}$ may be an implementation choice. For example, variation of $L_{STC}$ may be related to X2 latency, e.g. the shorter the $L_{STC}$, the shorter the delay in X2 latency and the shorter $L_{STC}$, the faster the traffic adaptation.

STC signaling may be base station to UE, e.g. eNodeB-to-UE, signaling, and/or base station to base station, e.g., eNodeB-to-eNodeB signaling. The eNodeB-to-UE signaling may be inband (i.e. take place on the unlicensed carrier, such as the secondary cell (SCell)) or carried over a carrier/cell on a licensed band such as the primary cell (PCell).

A UE may receive STC for a serving cell (operating on a licensed or unlicensed band) via broadcast signaling, dedicated RRC signaling, MAC signaling, or L1 signaling through e.g. physical downlink control channel (PDCCH) or enhanced physical downlink control channel (EPDCCH) downlink control information (DCI) assignment. The STC indication may be carried on the same serving cell (i.e. LAA cell) or alternatively, through a licensed band carrier (e.g. through the licensed band PCell).

Base stations, e.g. eNBs, may advertise the STC configuration applied to the neighboring cells e.g. via X2. This signalling may be considered as a recommendation rather than a command.

STC signaling may indicate, for each of the $L_{STC}$ subframes, the subframe type that shall always be followed by eNB and UE (subject to an operating channel being occupied by the given eNodeB/cell).

Figure 6:
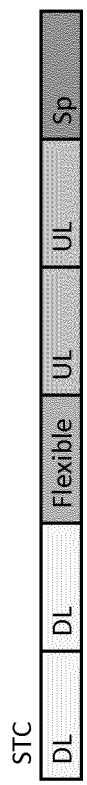
FIG. 6 shows an example subframe type configuration.

FIG. 6 shows an example STC. Possible subframe types include a DL subframe, an UL subframe, a special subframe (supporting DL-UL as well as UL-DL switching subframe), an empty (blank) subframe, a downlink subframe carrying short control signalling and a flexible subframe.

DL subframes carrying regular transmissions enabling synchronization, e.g. through SCS or other means, may be indicated separately. Such regular transmissions may include at least one or more of Discovery Signals (DRS), Primary and Secondary Synchronization signals (PSS and SSS, respectively), Cell-specific Reference Signals (CRS), and Channel State Information Reference Signals (CSI-RS).

A special subframe has a predetermined structure to facilitate some predetermined function, as opposed to a regular (TDD) subframe which contains just one link direction (i.e. UL or DL) . . . . For example, a special subframe may facilitate DL-UL switching. Hence, it may contain a guard period to make such a switching (DL to UL and vice versa). Another potential use case for special subframe is to facilitate LBT/CCA by providing an interruption in the transmission. In order to minimize overhead due to UL-DL switching or CCA, only a portion of the special subframe is used for those functions. The remaining part may be use for transmitting UL and/or DL payload and/or control or reference signals (uplink pilot time slot (UpPTS) or downlink pilot time slot (DwPTS) can be defined). Different options exist for the special subframe. A special subframe according to current TD-LTE may be defined as DwPTS, guard period (GP), UpPTS; for DL only as DwPTS, GP; for UL only as UpPTS, GP; for GP only: GP.

An empty subframe can be used for many purposes, e.g. Multimedia Broadcast Multicast Service (MBMS) or CCA or some UE/eNB measurements. UEs may not make any DL measurements during those subframes. During blank or empty subframes, nodes can perform specific operations for UE and/or eNB. Furthermore, an empty subframe can be used as a placeholder for functionalities introduced in a later LTE release (including e.g. device to device (D2D) or access point to access point (AP2AP) communications).

A flexible subframe is one where the type of subframe may change form one instance to another according to an eNB's scheduling decision.

STC signaling may also include information about the possible CCA slots, i.e. when the UE may perform CCA.

The receiving node, whether it is a base station or UE, may expect the base station transmitting STC to follow the given STC configuration in the LAA cell. The receiving node may use said STC information to cause the node to operate in accordance with that configuration in the secondary cell. For example, the frame structure applied by the node may be defined based on STC signalling. LBT procedure(s) and timing may be at least partly based on STC configuration. Timing of the regular UL/DL/flexible subframes may be aligned with that of the STC. Timing of other signals such as signals which are part of special subframes can deviate from STC subframe timing.

STC configuration may be used by a UE to define one or more PHY procedures (e.g. related to HARQ-ACK feedback arrangement, CSI measurement/reporting) in a predetermined way.

The UE may make use of STC in HARQ-ACK codebook size determination, that is, when the UE determines the number of HARQ-ACK buts to transmit for the secondary cell. The UE may determine the number of DL hybrid automatic repeat request (HARQ)-acknowledgment (ACK) bits for a given serving cell according to the subframe type indicated with STC. For example, for subframes indicated as UL, Special subframes without DwPTS or empty subframes, the UE may not feedback HARQ-ACK nor reserve bits for feedback, for example on PCell or SCell. For subframes indicated as DL, Special subframes including DwPTS, or Flexible, the UE can feedback HARQ-ACK or discontinuous reception (DRX) indication. I.e. HARQ-bit(s) shall be reserved for subframes indicated as DL, Special subframes including DwPTS, or Flexible.

A receiving node, such as a base station or eNB may use the STC information to determine the number of HARQ-ACK bits that it tries to receive and decode for the secondary cell.

An example of HARQ-ACK codebook size determination and connection to STC is shown in FIG. 7. In this example, it is assumed that multiple-input multiple-output (MIMO) Transmission mode with two spatial codewords is configured. DL subframe creates two HARQ-ACK bits (in UL direction). Special subframe creates at most two HARQ-ACK bits (in UL direction). Flexible subframe creates at most two HARQ-ACK bits (in UL direction). UL subframe creates 0 HARQ-ACK bits (in UL direction).

The UE may make use of the STC to enable CSI feedback. A UE may be allowed to measure CSI or interference on a given serving cell only in subframes indicated as DL or Special subframes including DwPTS unless instructed otherwise.

The UE may make use of the STC in (E)PDCCH blind decoding. The UE is not expected to perform control channel blind decoding on the unlicensed carrier in the subframes indicated as UL, Special subframes without DwPTS or empty subframes.

STC signaling can indicate to the UE when to perform the LBT CCA procedure, e.g. when to perform CCA in the case of UL operation. The UE may know, for example, that subframes with DL transmission need not be used for CCA.

Additionally, or alternatively, if the UE is informed about the STC of one or more neighboring cells, it can utilize the information on the subframe types in suppressing neighbor cell interference (i.e., network assisted interference coordination).

STC supports UEs in efficient HARQ-feedback operation, CSI measurements, and allows for minimization of UE energy consumption by avoiding unnecessary reception and decoding attempts of DL control channels.

Base stations, exchanging the STC information (e.g., eNodeB-to-eNodeB signalling) can make use of the information by aligning the transmission direction (i.e. subframe types) and subframe timing to minimize cross-link interference. Different base stations may provide the information about the STC they apply. They may receive similar information from the neighbouring base stations (originating possibly from different operators). Base stations may then align the subframe types defined by STC between neighboring nodes. This means, in a synchronized network with aligned STC between the eNodeBs there may be no cross-link interference present in fixed DL, fixed UL, empty, and special subframes. $L_{STC}$ impacts also on properties of interference signals.

Besides the issue of cross-link interference itself, the interference behavior gets more predictable, considering at least the interference created by neighbor cells' eNodeB transmissions.

The STC information exchanged can be used to align the rough timing of eNBs' LBT operation for DL transmissions, for example, in the case that LTE LAA follows LBE regulations. By aligning LBT operation across eNBs, an LTE LAA network can reach reuse 1 transmission especially in the case of low/medium load. When operating according to frame based equipment, DL timing can be defined exactly. It can be derived from STC as such, i.e. DL subframe timing (including LBT) is aligned between neighbouring nodes in predetermined manner.

When operating according to load based equipment type of operation, then timing is not exactly defined but it follows the LBT/CCA/extended CCA procedures. However, also in this case STC provides the timing limits where LBT/CCA/extended CCA procedures operate.

If LBT operation is not time aligned, eNB DL transmission may block other eNBs DL transmission performing LBT at a later time. This may trigger extended CCA procedure and cause delay for DL transmission.

Aligning subframe types and timing across cells simplifies LAA UL transmissions in network deployments with frequency reuse-1. Extended CCA operation, causing uncertainty on actual transmission time, may cause undesirable complications to LAA UL scheduling.

An underlying assumption in this operation is that the eNodeBs operating on unlicensed band, at the least the eNodeBs belonging to the same operator, are considered to be at least roughly time-synchronized.

The proposed solution facilitates interference coordination for LTE operation on unlicensed carriers by reducing the amount of crosslink interference and creating a more predictable interference situation. It facilitates also frequency reuse-1 operation on an unlicensed carrier across LTE eNBs belonging to the same network. Frequency reuse-1 operation may be seen as one key benefits of LTE LAA over existing competing technologies.

It should be understood that each block of the flowchart of FIG. 4 or 5 and any combination thereof may be implemented by various means or their combinations, such as hardware, software, firmware, one or more processors and/or circuitry.

Figure 8:
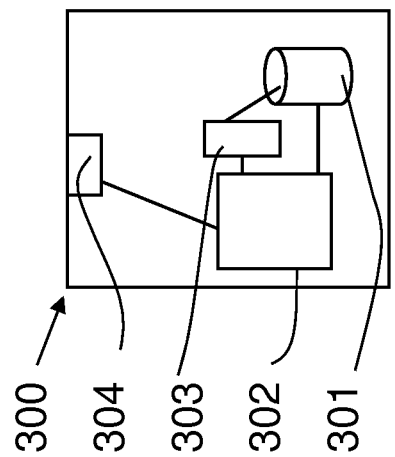
FIG. 8 shows a schematic diagram of an example control apparatus.

Embodiments described above by means of FIGS. 1 to 7 may be implemented on a control apparatus as shown in FIG. 8 or on a mobile device such as that of FIG. 2. FIG. 8 shows an example of a control apparatus for a communication system, for example to be coupled to and/or for controlling a station of an access system, such as a base station or (e) node B, or a server or host. In some embodiments, base stations comprise a separate apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may include controlling receiving, at a node, STC information, said STC information defining at least one subframe type of a group of subframes to be used in a secondary cell, said secondary cell configured to provide at least one of licensed-assisted access, licensed shared access and co-primary sharing access and using said STC information to cause the node to operate in accordance with that configuration in the secondary cell. Control functions may also include providing STC information to at least one node, said STC information defining at least one subframe type of a group of subframes, the group of subframes to be used in a secondary cell, said secondary cell configured to provide at least one of licensed-assisted access, licensed shared access and co-primary sharing access, wherein said STC information is to be used to cause the at least one node to operate in accordance with that configuration in the secondary cell.

An example of an apparatus comprises means for controlling receiving, at a node, STC information, said STC information defining at least one subframe type of a group of subframes to be used in a secondary cell, said secondary cell configured to provide at least one of licensed-assisted access, licensed shared access and co-primary sharing access and using said STC information to cause the node to operate in accordance with that configuration in the secondary cell.

Another example of an apparatus comprises means for providing STC information to at least one node, said STC information defining at least one subframe type of a group of subframes, the group of subframes to be used in a secondary cell, said secondary cell configured to provide at least one of licensed-assisted access, licensed shared access and co-primary sharing access, wherein said STC information is to be used to cause the at least one node to operate in accordance with that configuration in the secondary cell.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE, similar principles can be applied to any other communication system or radio access technology, such as 5G. In addition, although embodiments have been described from an LAA viewpoint, this disclosure may be equally valid for other co-existence scenarios. For example, Licensed Shared Access (LSA) is an example of a co-existence scenario. LSA is spectrum sharing concept enabling access to spectrum that is identified for IMT but not cleared for IMT deployment. LSA may be focused on bands subject to harmonization and standardized by 3GPP (2.3 GHz in EU & China, 1.7 GHz and 3550-3650 MHz in US). Co-primary sharing is another example of a co-existence scenario. Co-primary sharing refers to spectrum sharing where several primary users (operators) share the spectrum dynamically or semi-statically. Co-priamry sharing may be suitable e.g. for small cells at 3.5 GHz. Spectrum sharing between operators may happen if regulators require it and/or operators need it. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 7 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 7 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving, at a user equipment, subframe type configuration information for operating on unlicensed bands subject to listen-before-talk requirements, said subframe type configuration information defining at least one subframe type of a group of subframes to be used in a secondary cell, said secondary cell configured to provide at least one of licensed-assisted access, licensed shared access, and co-primary sharing access, wherein the at least one subframe type comprises at least one of a downlink subframe, an uplink subframe, a special subframe, a blank subframe, a downlink subframe carrying short control signaling, and a flexible subframe; and
using said subframe type configuration information to cause the user equipment to operate on the unlicensed bands subject to listen-before-talk requirements in accordance with a corresponding configuration in the secondary cell, the using said subframe information comprising at least one of: in determining when to perform at least one of a listen before talk procedure, channel state information measurements and feedback and control channel blind decoding, in determining number of acknowledgment bits for at least one subframe in dependence on the subframe type, in aligning transmission direction between a primary and secondary cell, and in timing of listen before talk procedure.

2. The method according to claim 1, the receiving further comprising receiving the subframe type configuration information by at least one of the following: a user equipment using the secondary cell and a user equipment using a primary cell.

3. The method according to claim 2, further comprising receiving the subframe type configuration information via one of broadcast signaling, dedicated radio resource signaling, medium access control signaling and physical layer signaling.

4. The method according to claim 1, wherein said group of subframes comprises a radio frame.

5. An apparatus comprising:
at least one processor and at least one memory including a computer program code, the at least one memory and the computer program code configured to, with the at least one processor, cause the apparatus at least to:
receive, at a user equipment, subframe type configuration information for operating on unlicensed bands subject to listen-before-talk requirements, said subframe type configuration information defining at least one subframe type of a group of subframes to be used in a secondary cell, said secondary cell configured to provide at least one of licensed-assisted access, licensed shared access, and co-primary sharing access, wherein the at least one subframe type comprises at least one of a downlink subframe, an uplink subframe, a special subframe, a blank subframe, a downlink subframe carrying short control signaling, and a flexible subframe; and
use said subframe type configuration information to cause the user equipment to operate on the unlicensed bands subject to listen-before-talk requirements in accordance with a corresponding configuration in the secondary cell, the using said subframe information comprising at least one of: in determining when to perform at least one of a listen before talk procedure, channel state information measurements and feedback and control channel blind decoding, in determining number of acknowledgment bits for at least one subframe in dependence on the subframe type, in aligning transmission direction between a primary and secondary cell, and in timing of listen before talk procedure.

6. The apparatus according to claim 5, wherein causing the apparatus to receive further comprising causing the apparatus to receive the subframe type configuration information by at least one of the following: a user equipment configured to use the secondary cell and a user equipment configured to use a primary cell.

7. The apparatus according to claim 6, wherein causing the apparatus to receive further comprising causing the apparatus to receive the subframe type configuration information at a user equipment via one of broadcast signaling, dedicated radio resource signaling, medium access control signaling and physical layer signaling.

8. The apparatus according to claim 5, wherein said group of subframes comprises a radio frame.

9. A computer program embodied on a non-transitory computer-readable storage medium, the computer program comprising program code for controlling a processor to execute a process, the process comprising:

controlling receiving, at a user equipment, subframe type configuration information for operating on unlicensed bands subject to listen-before-talk requirements, said subframe type configuration information defining at least one subframe type of a group of subframes to be used in a secondary cell, said secondary cell configured to provide at least one of licensed-assisted access, licensed shared access, and co-primary sharing access, wherein the at least one subframe type comprises at least one of a downlink subframe, an uplink subframe, a special subframe, a blank subframe, a downlink subframe carrying short control signaling, and a flexible subframe; and using said subframe type configuration information to cause the user equipment to operate on the unlicensed bands subject to listen-before-talk requirements in accordance with a corresponding configuration in the secondary cell, the using said subframe information comprising at least one of: in determining when to perform at least one of a listen before talk procedure, channel state information measurements and feedback and control channel blind decoding, in determining number of acknowledgment bits for at least one subframe in dependence on the subframe type, in aligning transmission direction between a primary and secondary cell, and in timing of listen before talk procedure.

10. The computer program according to claim 9, the process further comprising:

controlling receiving the subframe type configuration information by at least one of the following: a user equipment configured to use the secondary cell and a user equipment configured to use a primary cell.

11. The computer program according to claim 10, the process further comprising:

controlling receive the subframe type configuration information at a user equipment via one of broadcast signaling, dedicated radio resource signaling, medium access control signaling and physical layer signaling.

12. The computer program according to claim 9, wherein said group of subframes comprises a radio frame.

* * * * *